(12) United States Patent
Randall

(10) Patent No.: US 6,591,952 B1
(45) Date of Patent: Jul. 15, 2003

(54) COSMETIC APPLIANCE STORAGE AND CORD MANAGEMENT APPARATUS

(76) Inventor: Donna M. Randall, 805 Frazier St., Valley Falls, KS (US) 66088

( * ) Notice: Subject to any disclaimer, the term of this patent is extended or adjusted under 35 U.S.C. 154(b) by 0 days.

(21) Appl. No.: 10/124,900

(22) Filed: Apr. 18, 2002

(51) Int. Cl.[7] ............................................. H02G 11/02
(52) U.S. Cl. .................................................. 191/12.4
(58) Field of Search ......................... 191/12 R, 12.2 R, 191/12.4; 206/216, 701, 702, 389, 391, 409

(56) References Cited

U.S. PATENT DOCUMENTS

| | | | |
|---|---|---|---|
| 4,114,736 A | * | 9/1978 | Scherenberg ............... 191/12.4 |
| 5,379,903 A | | 1/1995 | Smith |
| 5,547,393 A | | 8/1996 | Jansen |
| 5,690,198 A | * | 11/1997 | Lohr ..................... 191/12.2 R |
| 5,723,815 A | | 3/1998 | Pena |
| 5,913,487 A | * | 6/1999 | Leatherman ............. 242/378.4 |
| 6,082,656 A | | 7/2000 | Thornton |
| 6,095,156 A | * | 8/2000 | Smith, II .................... 132/286 |

* cited by examiner

Primary Examiner—S. Joseph Morano
Assistant Examiner—Robert J. McCarry, Jr.
(74) Attorney, Agent, or Firm—Dale J. Ream

(57) ABSTRACT

A cosmetic appliance storage and cable management apparatus includes a housing having bottom, top, rear, and side walls. The apparatus includes a front panel pivotally coupled to the side walls. The front panel defines cable openings and includes sleeves for holding cosmetic appliances. The front panel is rotatable between a first configuration in which the openings and sleeves are accessible and a second configuration in which the openings and sleeves are hidden beneath the top wall. The apparatus includes a plurality of cable-reels, each cable-reel being biased in a retracting direction. Each cable-reel includes an electrical receptacle whereby a cable held thereon may be connected to an electrical power source. Each cable-reel includes a ratchet and release construction. The bias of the cable-reels and channels defined by the front panel eliminate slack in the cords of a plurality of cosmetic appliances.

20 Claims, 8 Drawing Sheets

COSMETIC APPLIANCE STORAGE AND CORD MANAGEMENT APPARATUS

BACKGROUND OF THE INVENTION

This invention relates generally to a retractable cable apparatus and, more particularly, to an apparatus for the storage of cosmetic appliances and for the management of corresponding electrical cords.

Barbers and beauticians typically use multiple different electric devices while performing their trade, such as hair clippers, razors, curling irons, and the like. As it is highly inconvenient to completely wrap up and store these devices in between uses, these multiple devices are typically left plugged in and resting on a countertop or hanging on hooks. The problem of tangled cords is apparent and may even cause a dangerous condition, e.g. a trip hazard.

Various devices have been proposed in the art for organizing cosmetic appliances and other devices have been proposed for retracting cables. Although assumably effective for their intended purposes, existing devices do not provide an efficient storage and work environment for the use of cosmetic appliances having multiple electrical cords.

Therefore, it is desirable to have a cosmetic appliance storage and cable management apparatus that enables multiple cosmetic appliances to be conveniently accessible without the disadvantages of multiple, lengthy power cords that may become entangled. Further, it is desirable to have an apparatus that provides convenient connection of multiple cosmetic appliances to an external electrical power source. In addition, it is desirable to have an apparatus in which appliance-retaining sleeves and power cords may be selectively hidden when not in use.

SUMMARY OF THE INVENTION

Accordingly, a cosmetic appliance storage and cord management apparatus according to the present invention includes a housing having top, bottom, side, and rear walls. The housing also includes a front panel pivotally coupled to the side walls and which defines first and second openings. The first opening is configured for insertion of a power cable therethrough while the second opening is connected to a sleeve capable of holding a cosmetic appliance. The front panel may include a plurality of first and second opening combinations. The front panel may be rotated such that the first and second openings are accessible and visible for use or such that these openings are hidden beneath the top housing wall for storage, such as when the cosmetic appliances and their cords have been properly stored away. A plurality of cable-reels are positioned within the housing, each cable-reel being biased in a retracting direction such that there is never any cable slack extending from the housing. Each cable-reel includes its own electrical receptacle such that a cord retracted about each cable-reel may be conveniently connected to an electrical power source.

Therefore, a general object of this invention is to provide a cosmetic appliance storage apparatus that may be pivoted between use and storage configurations in a cosmetology environment.

Another object of this invention is to provide an apparatus, as aforesaid, which efficiently manages and organizes multiple power cables associated with multiple cosmetic appliances.

Still another object of this invention is to provide an apparatus, as aforesaid, having multiple cable-reels each biased in a retracting direction to minimize cord entanglements.

Yet another object of this invention is to provide an apparatus, as aforesaid, which may be utilized with existing salon counter fixtures.

A further object of this invention is to provide an apparatus, as aforesaid, having a master power switch for selectively energizing the cables on all cable-reels within the housing.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
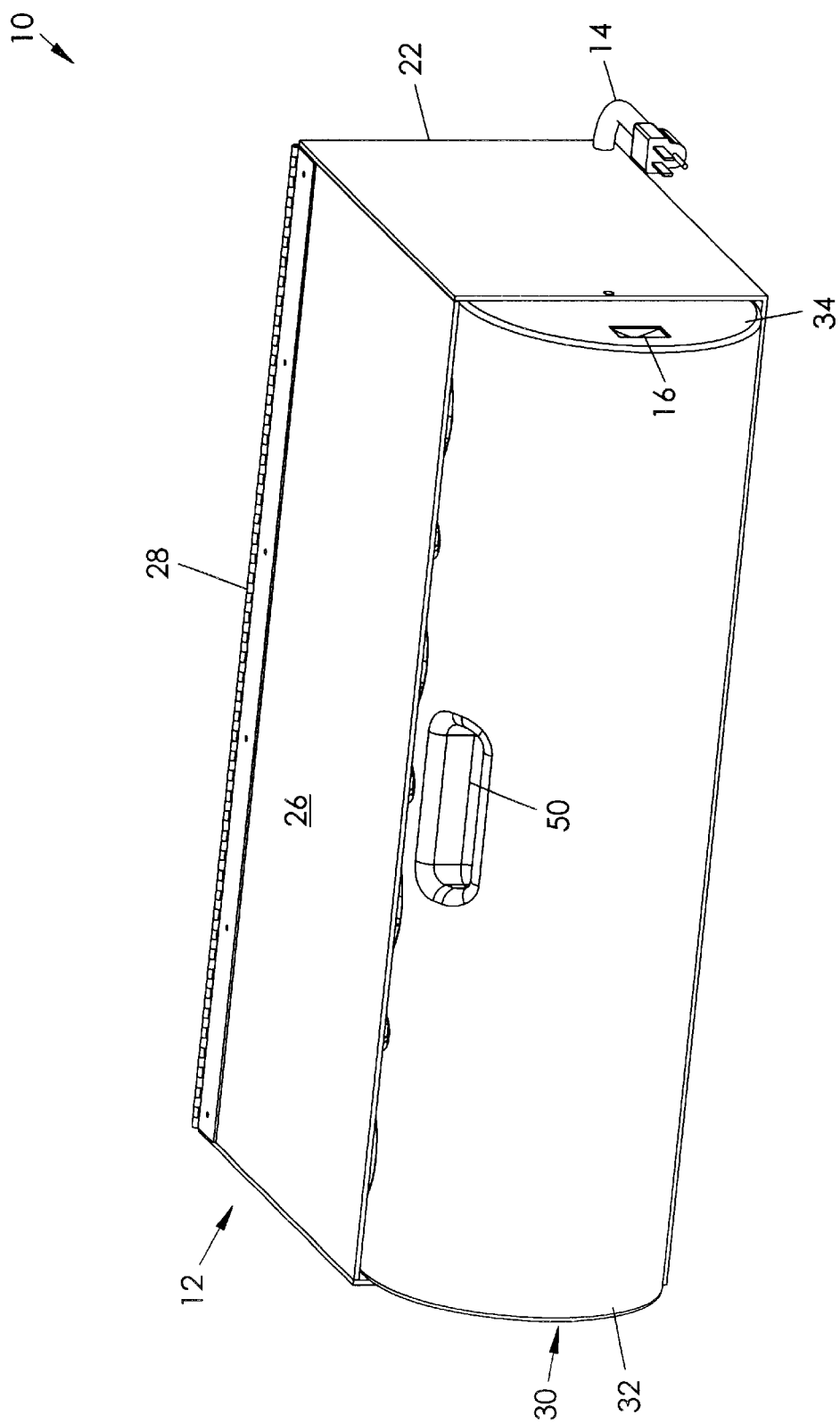
FIG. 1 is a perspective view of a cosmetic appliance storage apparatus according to a preferred embodiment of the present invention with a front panel in a storage configuration.
Figure 2:
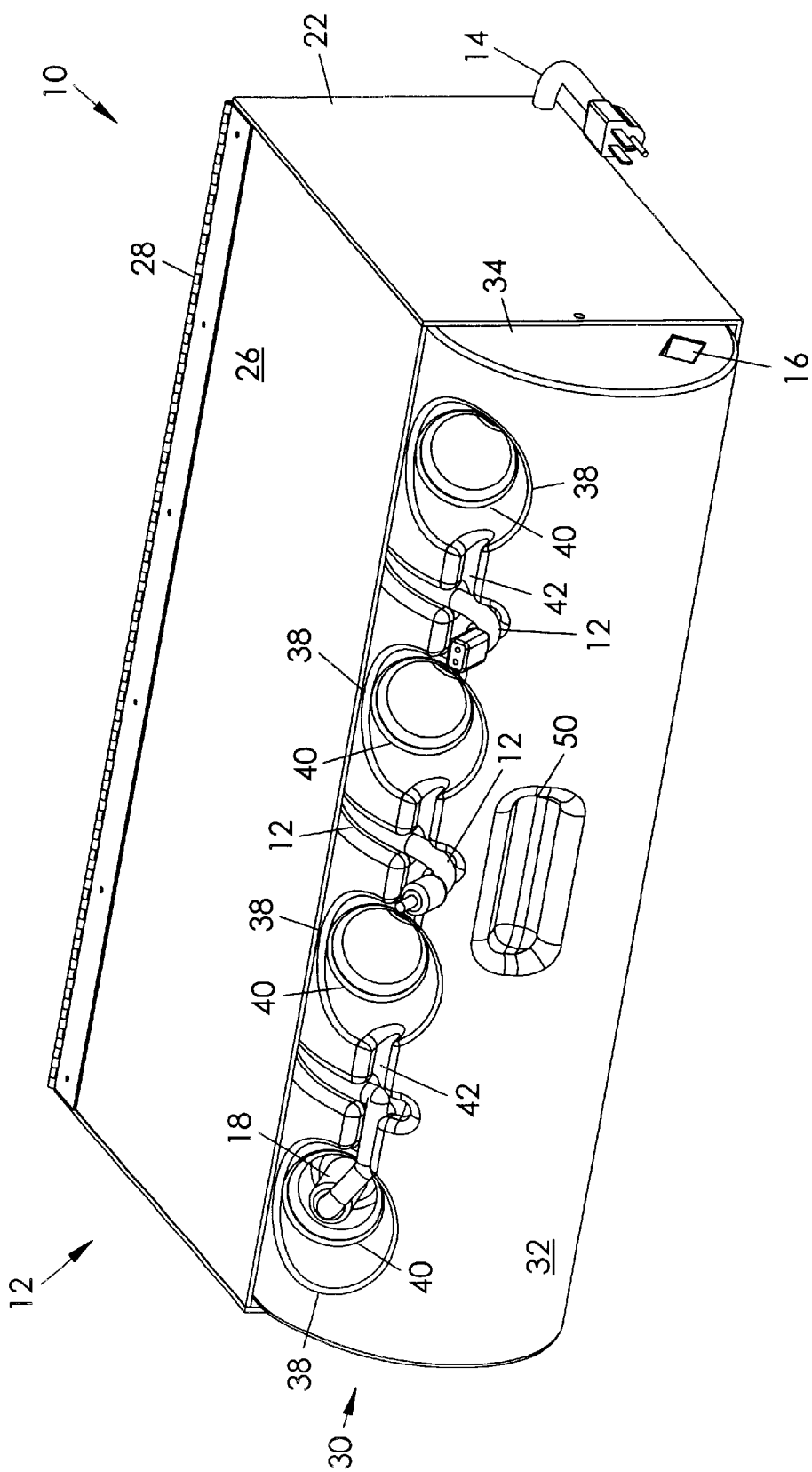
FIG. 2 is another perspective view of the apparatus as in FIG. 1 with the front panel in a use configuration.
Figure 3:
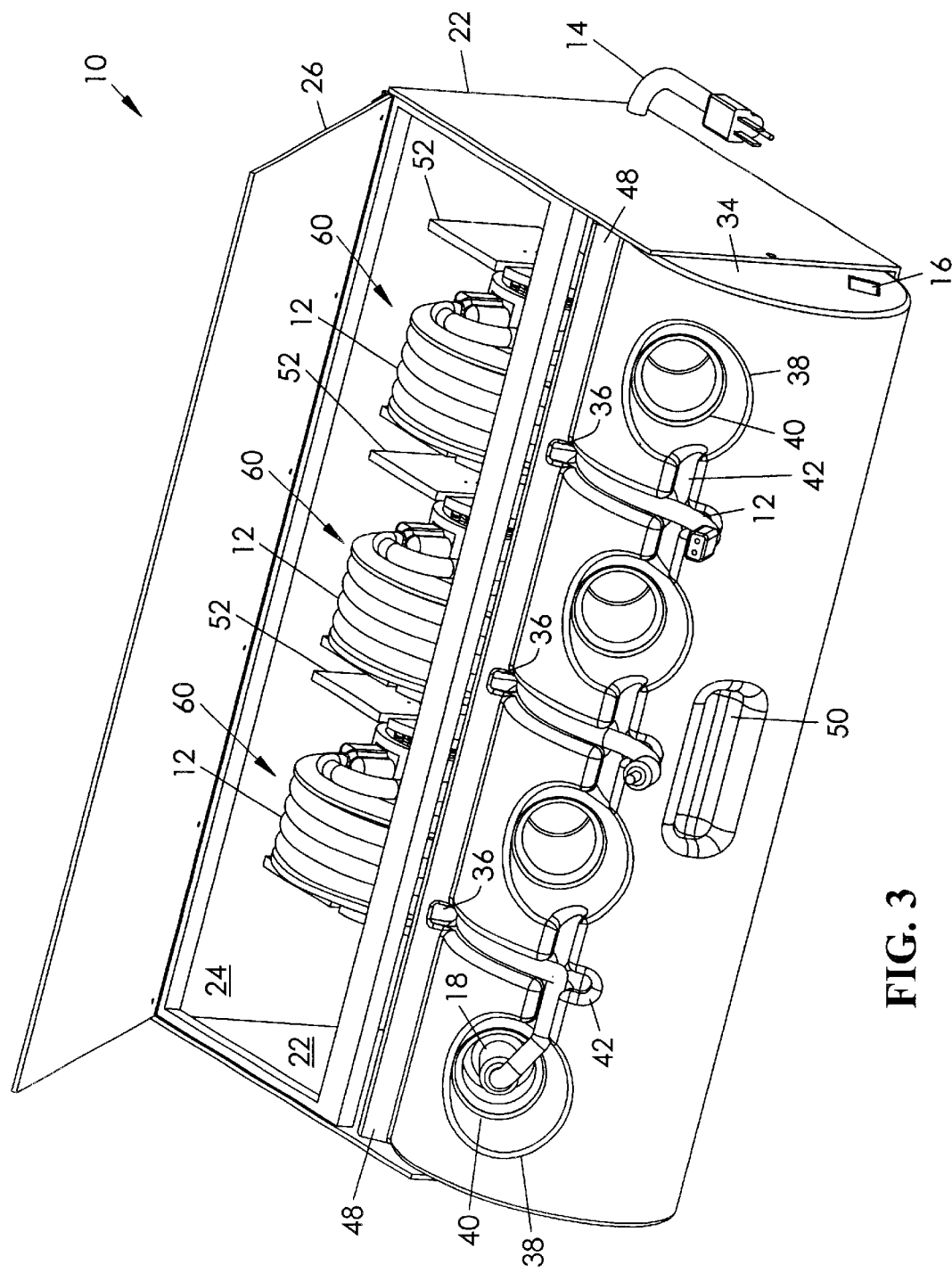
FIG. 3 is a perspective view of the apparatus as in FIG. 2 with a top wall in an open configuration.

A cosmetic appliance storage and cable management apparatus according to the present invention will now be described in detail with reference to FIGS. 1 through 8b of the accompanying drawings. The cosmetic appliance storage and cable management apparatus 10 includes a housing 12 having a bottom wall 21 with a pair of oppositely disposed side walls 22 extending upwardly therefrom (FIGS. 1–3). The housing 12 further includes a rear wall 24 normal to a rear edge of the bottom wall 21 and extending between the side walls 22. A top wall 26 is pivotally coupled to a top edge of the rear wall 24 with a hinge 28 and selectively movable between an open configuration (FIG. 3) and a closed configuration (FIG. 2). Therefore, a user may access the cable-reels mounted within the housing 12 via the pivotal top wall 26, as to be described more fully below. It is understood that it would also be suitable for the top wall 26 to be constructed and attached in a manner so as to be completely removable or to provide another suitable access door arrangement.

The cosmetic appliance storage apparatus 10 further includes a front panel 30 having an annular front surface 32 with opposing side portions 34 depending therefrom (FIG. 2). The side portions 34 of the front panel 30 are pivotally coupled to the side walls 22 of the housing 12 with a pin or the like. Preferably, the front surface 32 of the front panel 30 defines a plurality of first openings 36 and second openings 38 although a front panel with only a single set of openings would also work (FIG. 3). Each first opening 36 has a configuration suitable to receive an electrical cord therethrough. A tubular sleeve 40 is coupled to each second opening 38 and extends rearwardly relative to the front surface 32, each sleeve having a bottom wall and being capable of holding a cosmetic appliance therein. It is understood that the sleeves are not constrained to have a tubular construction and the openings need not have any particular shape configuration. The sleeves may also be of various lengths so as to accommodate a wide range of cosmetic appliances. Preferably, the sleeves 40 include a metal construction although a rigid plastic construction would also be suitable.

Figure 8A:
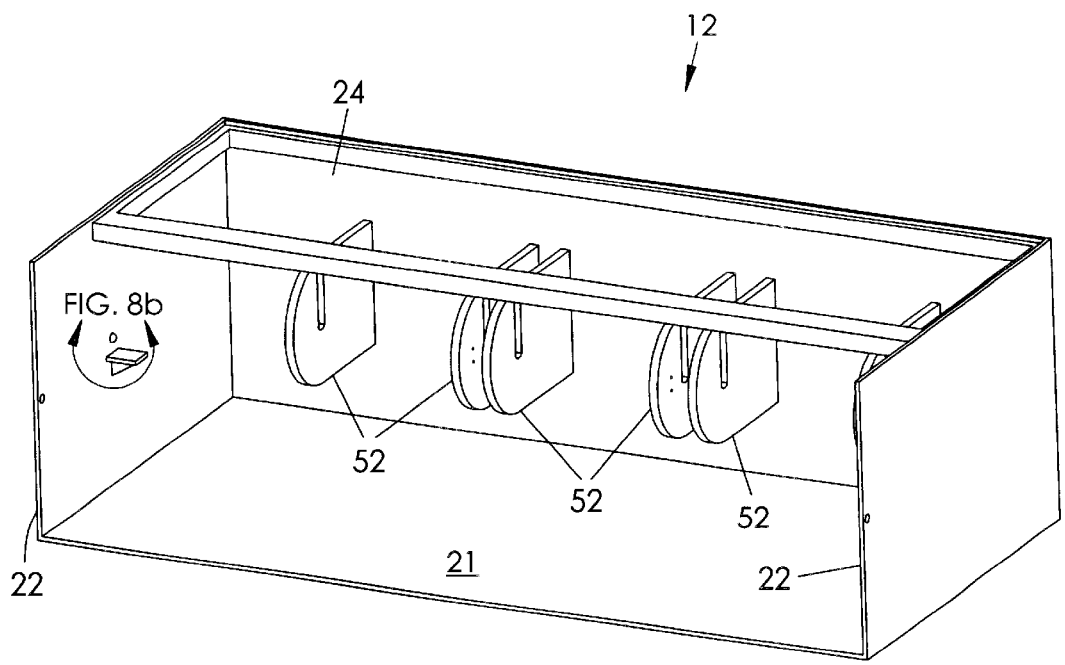
FIG. 8a is a perspective view of the apparatus housing as in FIG. 1 with the front panel removed.
Figure 8B:
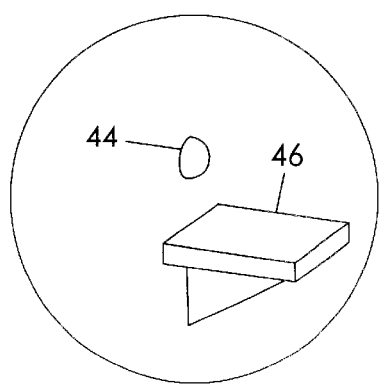
FIG. 8b is an isolated view of a nub and bracket combination of FIG. 8a on an enlarged scale.

An inner surface of each side wall 22 includes a nub 44 and a bracket 46, each bracket being downwardly spaced from a respective nub (FIGS. 8a and 8b). In addition, the front panel 30 includes a lip 48 extending longitudinally along a top edge of the front surface 32 between the side portions 34. Therefore, the front panel 30 may be rotated between a first configuration in which the first 36 and second 38 openings are visible and accessible (FIG. 2) and a second configuration in which the openings are hidden beneath the top wall 26 (FIG. 1). At the second configuration, the lip 48 of the front panel 30 may be releasably held between the nub 44 and bracket 46 combinations in a snap-fit relationship. When released, the weight of the front panel 30 causes its rotation to the first (use) configuration (FIG. 2).

The front surface 32 of the front panel 30 defines a recessed handle 50 so that a user may manually move the front panel between first and second configurations. Although a recessed handle is shown, the handle could also be a protruding fixture as is also common.

Figure 4:
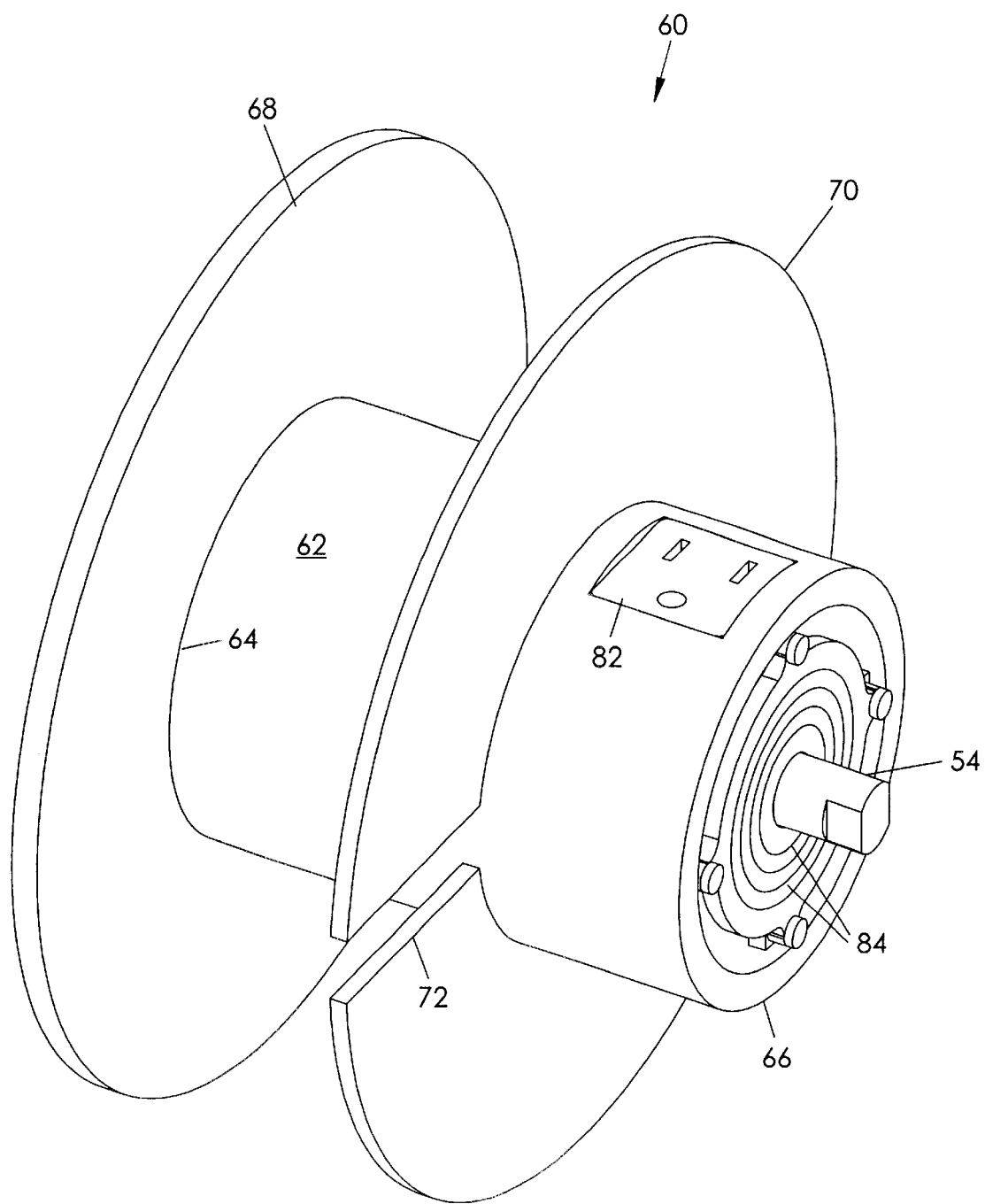
FIG. 4 is a perspective view on an enlarged scale of a cable-reel removed from the housing.
Figure 5:
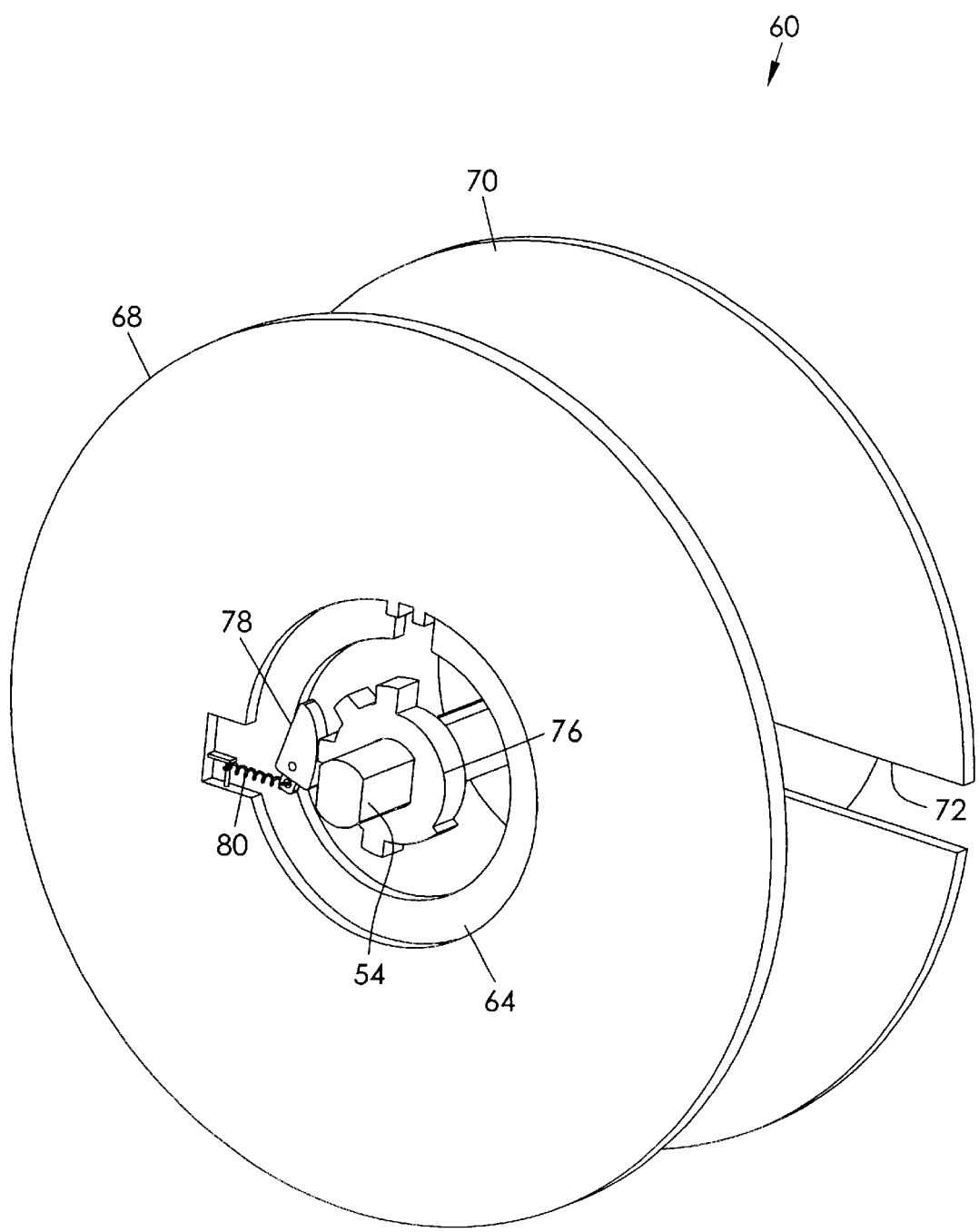
FIG. 5 is a perspective view of the cable-reel as in FIG. 4 from another angle.
Figure 6:
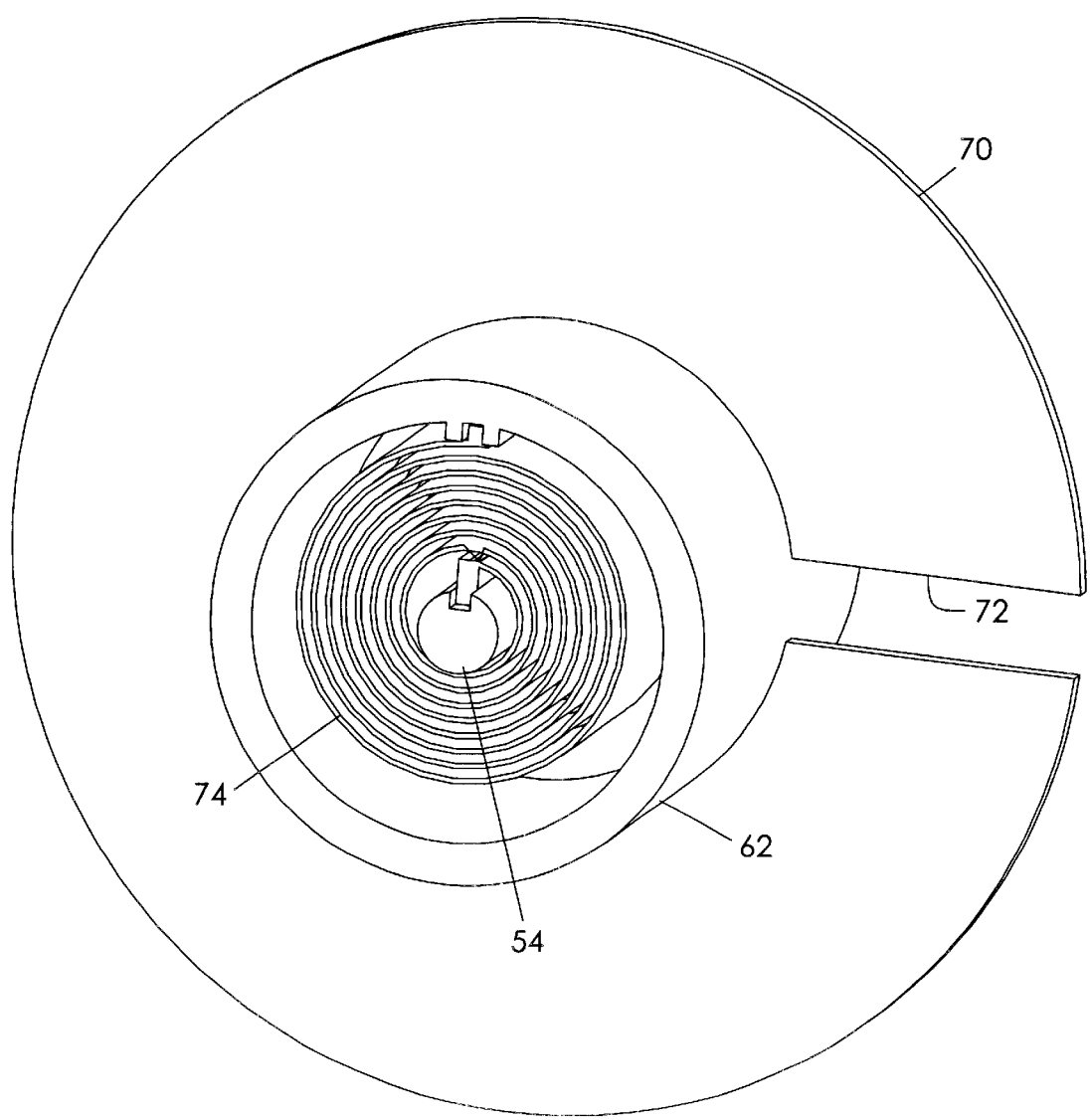
FIG. 6 is a fragmentary view of the cable-reel as in FIG. 4 showing a coil spring mounted within the reel-shaft.
Figure 7:
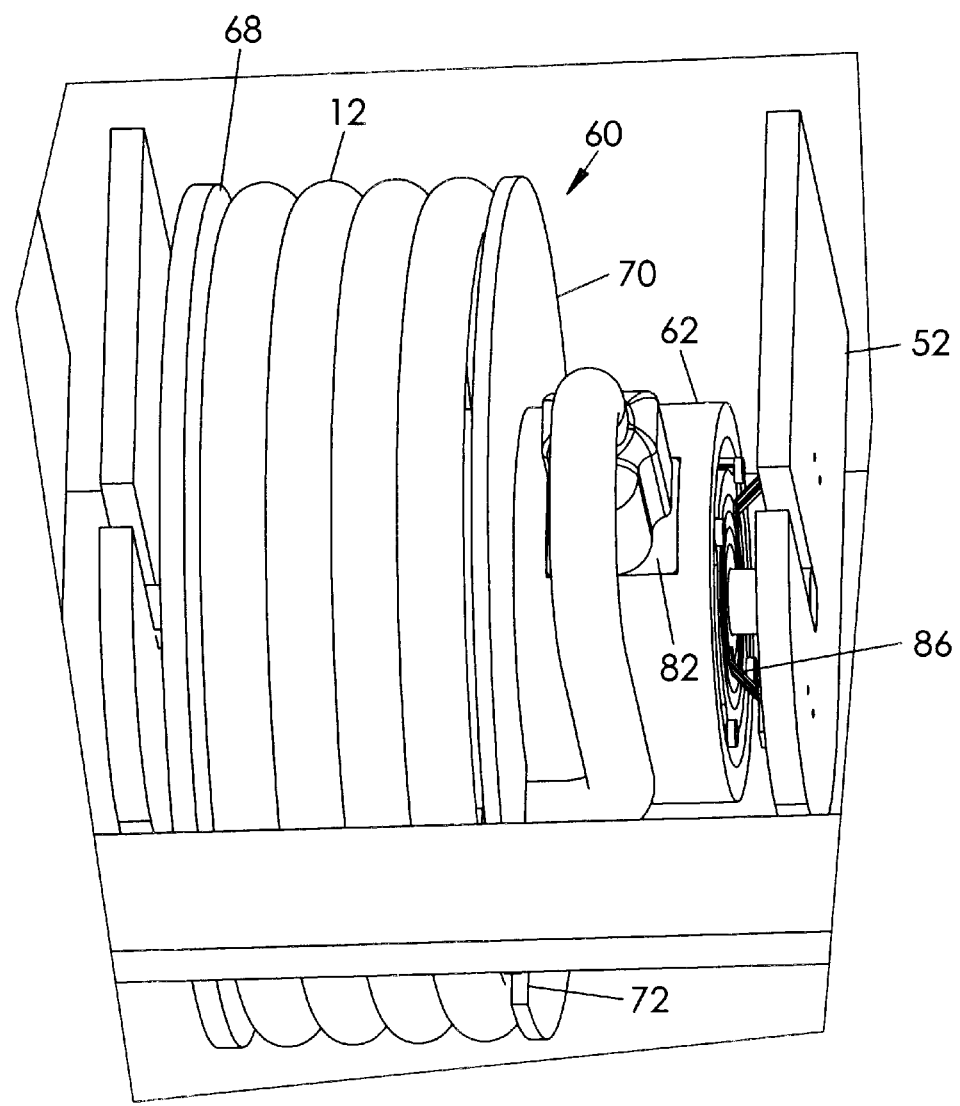
FIG. 7 is a fragmentary elevated perspective view of the apparatus as in FIG. 3.

The cosmetic appliance storage apparatus 10 includes a framework having a plurality of spaced apart frame walls 52 fixedly attached to the rear wall 24 (FIG. 8a). A shaft 54 is fixedly attached to and extends between respective adjacent frame walls 52. A plurality of cable-reels 60 are rotatably coupled to respective shafts 54. More particularly, each cable-reel 60 includes a hollow reel-shaft 62 having first 64 and second 66 ends and being rotatably coupled to a respective fixed shaft 54 for rotation thereabout (FIGS. 4 and 5). Each cable-reel 60 further includes a first circular plate 68 fixedly mounted to the first end 64 of a respective reel-shaft 62 and includes a second circular plate 70 fixedly mounted to a respective reel-shaft intermediate the first plate 68 and the second end 66 of the reel-shaft 62 (FIG. 4). The portion of the reel-shaft between the first and second plates is capable of receiving a power cable 12 thereabout (FIG. 3). Each cable-reel 60 is biased in a retracting direction with a coil spring 74 (FIG. 6). One end of each coil spring 74 is attached to the fixed shaft 54 and the other end is attached to the reel-shaft 62 so as to move the entire cable-reel 60 in a retracting direction whenever it is released from the ratchet means, as to be described more fully below.

Each cable-reel 60 includes a ratchet gear 76 fixedly attached to a respective fixed shaft 54 (FIG. 5). In addition, a pawl 78 is pivotally coupled to each reel-shaft 62 and biased toward a respective ratchet gear 76 with a spring 80 (FIG. 5). Therefore, as the cable-reel 60 is rotated in a cable-extension direction (i.e. as cable is payed out), the pawl 78 meshes with the teeth of the ratchet gear 76 and holds the reel-shaft 62 in the extended configuration. A cable-reel 60 may be released so as to automatically retract when the cable is tugged and released quickly, causing the pawl 78 to release from the ratchet teeth and be held out of the way as the reel-shaft and pawl move in a retracting direction about the ratchet gear 76.

Each cable-reel 60 includes an electrical receptacle 82 mounted upon the respective reel-shaft 62 between a second plate 70 and the second end 66 of the reel-shaft 62. The second plate 70 defines a slot 72 such that a plug end of a cable 12 may extend therethrough and be plugged in to the receptacle 82. Each receptacle 82 is electrically connected to a pair of terminals 84, respective pairs of terminals being rotatably coupled to respective fixed shafts 54. Corresponding electrical leads 86 are mounted to respective frame walls 52 for continuous contact with the terminals 84. These leads 86 are electrically connected to a main power cord 14 that extends from the housing 12 to an external power source. Therefore, a receptacle 82 on each cable-reel 60 makes energizing multiple cosmetic appliances efficient and convenient. A master power switch 16 is positioned on a side portion 34 of the front panel 30 and is electrically connected to the main power cord 14 for selectively and simultaneously energizing or inhibiting electricity to the receptacles.

The front surface 32 of the front panel 30 defines a plurality of channels 42 extending between the first 36 and second 38 openings. As a cable 12 of a cosmetic appliance 18 is biased in a retracted configuration and the appliance is positioned within a respective sleeve 40, the length of cable extending between corresponding first and second openings may be positioned within a corresponding channel 42 so as to lay flush with the front surface 32 of the front panel 30. The configuration of the channels 42 also acts as a stop such that the bias of a cable-reel does not pull a corresponding cosmetic appliance out of its sleeve.

In use, the cosmetic appliance storage and cable management apparatus 10 may be placed on an existing salon countertop or even on a shelf within such cosmetology furnishings. When not in use, the front panel 30 may be rotated rearwardly such that the cord and sleeve openings are hidden beneath the top wall (FIG. 1). The lip 48 of the top wall 26 may be held securely in this configuration in a snap-fit or other friction-fit relationship. When use of the apparatus 10 is desired, a user may rotate the front panel 30 forward into a use configuration (FIG. 2) in which the cord and sleeve openings are visible and accessible. Ends of electrical cords retracted on the cable-reels 60 may extend through the first openings and be connected to desired cosmetic appliances. It is understood, of course, that cables having various types of plugs or receptacles may be used with this apparatus as needed relative to the requirements of desired cosmetic appliances (FIG. 3). The opposite end of each cable 12 may be plugged in to a respective receptacle 82 on the cable-reel reel-shaft 62.

When the cosmetic appliance is in use, additional lengths of cable may be payed out, the additional cable being retracted when use is complete so as to eliminate slack that could otherwise become entangled. The channels 42 defined by the front surface 32 of the front panel 30 further provide for the elimination of cable slack and also keep the retraction of the cable-reels 60 from dislodging corresponding cosmetic appliances from their respective sleeves 40.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A cosmetic appliance storage and cord management apparatus, comprising:

a housing having a bottom wall with a pair of oppositely disposed side walls extending upwardly from said bottom wall and having an upstanding rear wall extending between said side walls, said housing including a top wall coupled to said rear wall and extending between said side walls;

a front panel pivotally coupled to said side walls and extending therebetween opposite said rear wall, said front panel defining a first opening and a second opening;

a tubular sleeve coupled to said second opening and adapted to hold a cosmetic appliance;

said front panel being selectively rotatable between a first configuration in which said first and second openings are accessible and a second configuration in which said first and second openings are hidden beneath said top wall;

a framework situated on said rear wall;

a cable-reel rotatably mounted to said framework and positioned in said housing for selectively unwinding a cable therefrom and retracting said cable thereabout, said first opening adapted to receive a first end of said cable therethrough for connection to a cosmetic appliance; and means for biasing said cable-reel in a retracting direction.

2. The apparatus as in claim 1 wherein said means for biasing said cable-reel includes a coil spring attached at one end to said framework and attached at another end to said cable-reel, said coil spring being configured to bias said cable-reel for movement in a retracting direction.

3. The apparatus as in claim 2 further comprising:

ratchet means for holding said cable-reel at a user-selected configuration such that a selected length of said cable is payed out; and release means for selectively releasing said ratchet means to permit said coil spring to rotate said cable-reel in a retracting direction such that said cable is automatically retracted onto said cable-reel.

4. The apparatus as in claim 1 wherein:

said framework includes a shaft spanning between a pair of frame walls; and said cable-reel includes a hollow reel-shaft coupled to said shaft for rotation thereabout and having first and second ends, said cable-reel having a first circular plate mounted to said first end of said reel-shaft and a second circular plate mounted to said reel-shaft intermediate said first plate and said second end, whereby a portion of said reel-shaft spanning between said first and second plates is adapted to receive said cable thereabout.

5. The apparatus as in claim 4 further comprising an electrical receptacle mounted on said reel-shaft between said second plate and said second end thereof and adapted to receive a plug end of said cable, said receptacle being electrically connected to a pair of terminals rotatably coupled to said shaft and adapted to be electrically connected to an electrical power source.

6. The apparatus as in claim 1 wherein said top wall is pivotally connected to said rear wall for providing selective access to said cable-reel.

7. The apparatus as in claim 1 wherein said front panel defines a channel extending between said first and second openings for guiding said cable between a cosmetic appliance and said cable-reel.

8. The apparatus as in claim 5 further comprising means for selectively interrupting current flowing between said electrical power source and said terminals.

9. The apparatus as in claim 1 wherein:

an interior surface of each side wall of said housing includes a nub and a bracket fixedly attached thereto, said bracket being downwardly displaced from said nub; and said front panel includes a handle for user movement of said front panel between said first and second configurations, said front panel having a lip extending longitudinally along a top edge of said front surface, said lip adapted to be releasably held between respective nubs and brackets at said second configuration.

10. A cosmetic appliance storage and cord management apparatus, comprising:

a housing having a bottom wall with a pair of oppositely disposed side walls extending upwardly from said bottom wall and having an upstanding rear wall extending between said side walls, said housing including a top wall pivotally coupled to said rear wall and extending between said side walls;

a front panel having an annular front surface defining first and second openings, said front panel having opposed side portions depending from said front surface and being pivotally coupled to said side walls;

said front panel being selectively rotatable between a first configuration in which said first and second openings are visible and displaced forward of said top wall of said housing and a second configuration in which said first and second openings are hidden beneath said top wall;

a framework situated on said rear wall and having a plurality of spaced apart frame walls;

a plurality of cable-reels rotatably mounted to respective frame walls of said framework, each cable-reel capable of selectively unwinding a cable therefrom and retracting said cable thereabout, respective first openings of said front panel adapted to receive a first end of a respective cable therethrough for connection to a cosmetic appliance; and means for independently biasing respective cable-reels in retracting directions.

11. The apparatus as in claim 10 further comprising a plurality of tubular sleeves, each sleeve being coupled to a respective second opening of said front panel and capable of retaining a cosmetic appliance.

12. The apparatus as in claim 10 wherein:

an interior surface of each side wall of said housing includes a nub and a bracket fixedly attached thereto, said bracket being downwardly displaced from said nub; and said front panel includes a handle for user movement of said front panel between said first and second configurations, said front panel having a lip extending longitudinally along a top edge of said front surface, said lip adapted to be releasably held between respective nubs and brackets at said second configuration.

13. The apparatus as in claim 10 wherein:

said framework includes a plurality of shafts, each shaft being fixedly mounted between respective frame walls;

each cable-reel includes a hollow reel-shaft coupled to a respective shaft for rotation thereabout and having first and second ends, said cable-reel having a first circular plate mounted to said first end of said reel-shaft and a second circular plate mounted to said reel-shaft intermediate said first plate and said second end such that a portion of said reel-shaft spanning between said first and second plates is adapted to receive a respective cable thereabout.

14. The apparatus as in claim 13 wherein each cable-reel includes an electrical receptacle mounted on a portion of a respective reel-shaft between a respective second plate and a respective second end of a respective reel-shaft, each electrical receptacle adapted to receive a plug end of a respective cable and being electrically connected to a pair of terminals rotatably coupled to said respective shaft, respective pairs of terminals being adapted for electrical connection to an external electrical power source.

15. The apparatus as in claim 13 wherein said means for biasing said cable-reels includes a plurality of coil springs, each coil spring having one end attached to a respective shaft and having another end attached to a respective reel-shaft, each coil spring being adapted to bias said respective cable-reel in a retracting direction.

16. The apparatus as in claim 15 wherein each cable-reel includes:
   ratchet means for holding a respective cable-reel at a user-selected configuration such that a selected length of a respective cable is payed out; and
   release means for selectively releasing a respective ratchet means so as to permit a respective coil spring to rotate said respective cable-reel in a retracting direction such that said respective cable is automatically retracted onto said respective cable-reel.

17. The apparatus as in claim 10 wherein said front panel defines a plurality of channels extending between respective first and second openings for guiding respective cables between corresponding cosmetic appliances and respective cable-reels.

18. A cosmetic appliance storage and cord management apparatus, comprising:
   a housing having a bottom wall with a pair of oppositely disposed side walls extending upwardly from said bottom wall and having an upstanding rear wall extending between said side walls, said housing including a top wall pivotally coupled to said rear wall and extending between said side walls;
   a front panel having an annular front surface defining first and second openings, said front panel having opposed side portions depending from said front surface and being pivotally coupled to said side walls;
   said front panel being selectively rotatable between a first configuration in which said first and second openings are visible and displaced forward of said top wall of said housing and a second configuration in which said first and second openings are hidden beneath said top wall;
   a plurality of sleeves, each sleeve being coupled to a respective second opening and extending rearwardly from said front surface of said front panel, each sleeve having a bottom wall and being capable of retaining a cosmetic appliance therein;
   a framework situated on said rear wall and having a plurality of spaced apart frame walls normal to said rear wall;
   a plurality of cable-reels rotatably mounted to respective frame walls of said framework, each cable-reel capable of selectively unwinding a cable therefrom and retracting said cable thereabout, respective first openings of said front panel adapted to receive a first end of a respective cable therethrough for connection to a cosmetic appliance;
   wherein each cable-reel includes an electrical receptacle mounted on a respective reel-shaft between a respective second plate and respective second end thereof, each electrical receptacle adapted to receive a plug end of a respective cable and being electrically connected to a pair of terminals rotatably coupled to said respective shaft, respective pairs of terminals being adapted for electrical connection to an external electrical power source; and
   means for independently biasing respective cable-reels in retracting directions.

19. The apparatus as in claim 18 wherein:
   an interior surface of each side wall of said housing includes a nub and a bracket fixedly attached thereto, said bracket being downwardly displaced from said nub; and
   said front panel includes a handle for user movement of said front panel between said first and second configurations, said front panel having a lip extending longitudinally along a top edge of said front surface, said lip adapted to be releasably held between respective nubs and brackets at said second configuration.

20. The apparatus as in claim 18 wherein each cable-reel includes:
   ratchet means for holding a respective cable-reel at a user-selected configuration such that a selected length of a respective cable is payed out; and
   release means for selectively releasing a respective ratchet means so as to permit a respective biasing means to rotate said respective cable-reel in a retracting direction such that said respective cable is automatically retracted onto said respective cable-reel.

* * * * *